May 22, 1934. O. BARNACK 1,960,044
SETTING FOR THE OBJECTIVES OF PHOTOGRAPHIC CAMERAS
Filed July 13, 1932
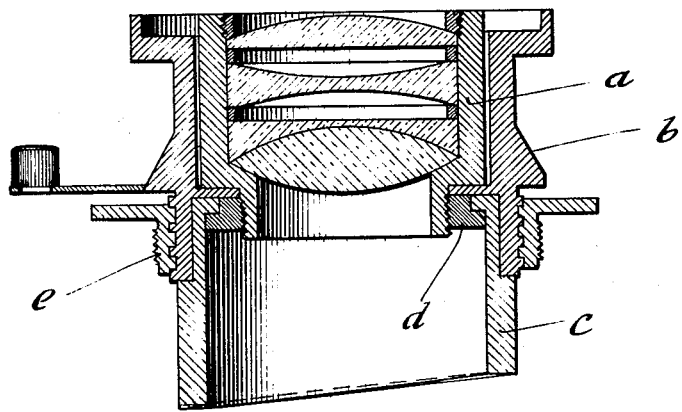
INVENTOR
Oskar Barnack
BY
ATTORNEY Patented May 22, 1934

1,960,044

UNITED STATES PATENT OFFICE 1,960,044

SETTING FOR THE OBJECTIVES OF PHOTOGRAPHIC CAMERAS

Oskar Barnack, Wetzlar, Germany, assignor to Ernst Leitz, Optische Werke, G. m. b. H., Wetzlar, Germany Application July 13, 1932, Serial No. 622,182
In Germany January 15, 1932

1 Claim. (Cl. 95—44)

This invention relates to improvements in the settings for the objectives of photographic cameras, principally cameras with exchangeable objectives, and it is the principal object of my invention to provide a curve ring for such objectives doing away with the necessity of providing the objective setting with a permanent stationary curve operating the lever of a range finder during the focusing of the objective to allow the proper adjustment of the mirror range finder connected with the camera.

Another object of my invention is the provision of a setting for the objectives adapted to receive curve rings having each a different type of curve in order to enable a simple exchange within the objective setting which is principally advantageous in the manufacture.

These and other objects of my invention will become more fully known as the description thereof proceeds, and will then be more specifically defined in the appended claim.

In the accompanying drawing forming a material part of this disclosure:

The single figure is a sectional elevation of an objective setting for photographic apparatus constructed according to my invention.

As illustrated, an objective setting comprises an inner member $a$ and an outer member $b$ and between both a curve member $c$ is secured by means of a special ring member $d$, while a separate ring member $e$ is threaded to the threaded reduced part of the outer member $b$ for the purpose of screwing the objective setting and objective into a camera.

It will be clear that by this construction the curve member $c$ can readily be exchanged to suit the respective objective setting.

It will be understood that I have disclosed the preferred form of my invention as one example only of the many possible ways to practically construct the same, and that I may make such changes in the construction of the invention and its minor details as come within the scope of the appended claim without departure from the spirit of my invention and the principles involved.

Having thus described my invention, what I claim as new and desire to secure by Letters Patent is:

In photographic objectives, a means to permit the ready exchange of the objective, comprising a setting for said objective composed of an inner and an outer member, a curve ring suited to the special objective to be used engaging said outer member, a special ring member for securing said curve ring to the inner member of the objective setting, and a ring member secured to the outer member of the objective setting for the purpose of attaching the objective to a camera.

OSKAR BARNACK.